(12) United States Patent
Ayachitula et al.

(10) Patent No.: US 8,799,436 B2
(45) Date of Patent: Aug. 5, 2014

(54) SYSTEM AND METHOD FOR AUTOMATED CONFIGURATION CONTROL, AUDIT VERIFICATION AND PROCESS ANALYTICS

(75) Inventors: Naga A. Ayachitula, Yorktown Heights, NY (US); Melissa J. Buco, Yorktown Heights, NY (US); Bradford Austin Fisher, Raleigh, NC (US); David Loewenstern, Yorktown Heights, NY (US); Larisa Schwartz, Yorktown Heights, NY (US); Christopher Ward, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 904 days.

(21) Appl. No.: 12/502,948

(22) Filed: Jul. 14, 2009

(65) Prior Publication Data

US 2011/0016368 A1 Jan. 20, 2011

(51) Int. Cl.
| | | |
|---|---|---|
| *G06F 15/173* | (2006.01) | |
| *H04L 12/24* | (2006.01) | |
| *G06F 9/44* | (2006.01) | |
| *G06F 11/07* | (2006.01) | |

(52) U.S. Cl.
CPC .............. *H04L 41/0853* (2013.01); *G06F 8/71* (2013.01); *H04L 41/085* (2013.01); *H04L 41/0856* (2013.01)
USPC ........... 709/223; 709/224; 707/694; 707/758; 707/609; 707/769; 717/120; 717/121

(58) Field of Classification Search
CPC ... H04L 41/08; H04L 41/085; H04L 41/0853; H04L 41/0856; H04L 41/0859; H04L 41/0873; H04L 41/0866; H04L 41/02; H04L 41/024; G06F 17/30371; G06F 17/30289; G06F 8/71
USPC .......... 709/223–224; 707/694, 758, 609, 769; 717/120–121
See application file for complete search history.

(56) References Cited

U.S. PATENT DOCUMENTS

| | | | |
|---|---|---|---|
| 7,971,231 B2 * | 6/2011 | Gupta et al. | 726/1 |
| 8,161,047 B2 * | 4/2012 | Akiyama et al. | 707/736 |
| 2002/0194160 A1 * | 12/2002 | Garrow et al. | 707/2 |
| 2007/0130330 A1 * | 6/2007 | Ridel et al. | 709/224 |
| 2007/0168696 A1 * | 7/2007 | Ridel et al. | 714/4 |
| 2007/0203952 A1 * | 8/2007 | Baron et al. | 707/200 |
| 2008/0209005 A1 * | 8/2008 | Akamatsu et al. | 709/217 |
| 2008/0263084 A1 * | 10/2008 | Faihe et al. | 707/103 R |
| 2008/0312986 A1 * | 12/2008 | Braun et al. | 705/7 |
| 2009/0055518 A1 * | 2/2009 | Auvenshine et al. | 709/223 |
| 2009/0094695 A1 * | 4/2009 | Bansal et al. | 726/21 |
| 2009/0138883 A1 * | 5/2009 | McLean | 718/104 |
| 2009/0144319 A1 * | 6/2009 | Panwar et al. | 707/102 |

(Continued)

*Primary Examiner* — Alina N Boutah
(74) *Attorney, Agent, or Firm* — F. Chau & Associates, LLC; Louis J. Percello, Esq.

(57) ABSTRACT

A method for auditing and verifying configuration items (CIs) in an information technology (IT) configuration management database (CMDB) includes identifying which configuration item (CI) types should be part of an audit, defining link rules to link an authorized CI type stored in a CMDB to an actual CI type that is part of an IT infrastructure, retrieving all authorized CI instances of the identified CI types from the CMDB, retrieving all actual CI instances of the identified CI types from a discovery upload of a current IT environment, comparing the actual CI instances to the authorized CI instances, and taking remedial action when variances are discovered.

34 Claims, 4 Drawing Sheets

(56) References Cited

U.S. PATENT DOCUMENTS

| | | |
|---|---|---|
| 2009/0177692 A1* | 7/2009 | Chagoly et al. ............ 707/104.1 |
| 2009/0187596 A1* | 7/2009 | Akiyama et al. ........... 707/104.1 |
| 2009/0216786 A1* | 8/2009 | Akiyama et al. ............. 707/100 |
| 2009/0228506 A1* | 9/2009 | Wada et al. ................... 707/101 |
| 2009/0240510 A1* | 9/2009 | Hopkins et al. ................... 705/1 |
| 2009/0249340 A1* | 10/2009 | Akiyama et al. ............. 718/100 |
| 2009/0287936 A1* | 11/2009 | Ohkado ........................ 713/183 |
| 2009/0319576 A1* | 12/2009 | Srour et al. ................... 707/200 |
| 2009/0319932 A1* | 12/2009 | Robinson et al. ............. 715/771 |
| 2009/0327630 A1* | 12/2009 | Akamatsu et al. ............ 711/162 |
| 2010/0057780 A1* | 3/2010 | Isobe et al. .................. 707/104.1 |
| 2010/0070458 A1* | 3/2010 | Otsuka et al. .................... 706/59 |
| 2010/0095273 A1* | 4/2010 | Matthiesen .................... 717/120 |
| 2010/0106821 A1* | 4/2010 | Akiyama et al. .............. 709/224 |
| 2010/0131473 A1* | 5/2010 | Bjork et al. ................... 707/690 |
| 2010/0179939 A1* | 7/2010 | Rangarajan et al. .......... 707/609 |
| 2010/0179945 A1* | 7/2010 | Rangarajan et al. .......... 707/694 |
| 2011/0055165 A1* | 3/2011 | McKay ......................... 707/682 |

* cited by examiner (a)  (b)

SYSTEM AND METHOD FOR AUTOMATED CONFIGURATION CONTROL, AUDIT VERIFICATION AND PROCESS ANALYTICS

TECHNICAL FIELD

The present disclosure is directed to the field of IT Service Management, in particular to a methodology for IT service management process automation in the area of configuration control, audit verification, process analytics and automated variance detection for effective configuration management with human centric remediation for resolving the detected variances.

DISCUSSION OF THE RELATED ART

Today's information technology (IT) environments are generally large, complex, distributed, and constantly being changed. Although most changes are intended to fix or improve the environment, many changes often have unexpected, undesirable, and costly effects on the environment. Therefore, it is desirable, in IT service management, for the configuration of the IT environment to be carefully controlled.

An IT environment is generally represented in terms of configuration items (CIs). CIs include all infrastructure resources that are in under the management of or whose control is governed by an IT service management configuration process. Examples of CIs and CI types include computer systems, applications, business services, routers, switches, printers, etc. A computer system is a CI type: for example, server01.watson.ibm.com and gdil_server_2.watson.ibm.com are CIs instances of type ComputerSystem. CIs are uniquely identified in such environments by the use of naming rules (or keys). For example, in the IT domain one such practice is expressed by the IT Infrastructure Library (ITIL) in which a Configuration Management Database (CMDB) and a plurality of Configuration Management processes are defined. The CMDB can be either a unified database or a federated database where a collection of databases presents a single user interface. The CMDB stores CIs and their attributes and details about the relationships between CIs. Information that is stored within a CMDB is accessible by one or more system/service management applications to accomplish their task.

Changes to CI records may come from a variety of sources, such as discovery adaptors, manual entry via a user interface, bulk loads from applications, and as such must be controlled. Configuration control is concerned with ensuring that only authorized and identifiable CIs are recorded from receipt to disposal. It ensures that no CI is added, modified, replaced or removed without appropriate controlling documentation, for example, an approved change request. As a result of configuration control, the CMDB, which includes attributes of and relationships between the CIs in the IT environment, serves as a source of authorized configuration information that can be used by all of the other service processes, such as incident, problem, and change processes, etc. In addition, the CMDB maintains relationships between configuration items and other service support artifacts, such as change records and incident records. The CMDB can be represented by a directed graph in which the nodes are CIs and the edges are the relationships, with the direction being determined by the nature of the relationship. This graph may have cycles. However, it should be noted that the relationship between two CIs can also be considered a CI. Because the CMDB serves as the source of information for decision making by many other process, the accuracy of the CMDB is important. Therefore, regular audits are needed to verify that the CMDB correctly reflects the environment. This is an opportunity to detect and correct any errors in the CMDB as well as unauthorized changes that may have been made to the IT environment. For an environment of even moderate size, these activities are time consuming and prone to human error, which makes them prime candidates for automation.

SUMMARY OF THE INVENTION

Exemplary embodiments of the invention as described herein generally include methods and systems for IT service management process automation in the area of configuration control, audit verification and process analytics. An embodiment of the invention provides an automated approach to variance detection of hierarchically defined configuration items in a CMDB against actual CIs in the IT environment. A configuration audit verification process according to an embodiment of the invention identifies which direction a relationship should be traversed for comparison purposes, uses a template to define which CIs should be part of the audit, defines link-rules for the actual-to-authorized comparison, compares the relationships and attributes for the actual and authorized CIs, and processes the reconciliation results.

According to an aspect of the invention, there is provided a method for auditing and verifying configuration items (CIs) in an information technology (IT) configuration management database (CMDB), including identifying which configuration item (CI) types should be part of an audit, defining link rules to link an authorized CI type stored in a CMDB to an actual CI type that is part of an IT infrastructure, retrieving all authorized CI instances of the identified CI types from the CMDB, retrieving all actual CI instances of the identified CI types from a discovery upload of a current IT environment, comparing the actual CI instances to the authorized CI instances, and taking remedial action when variances are discovered.

According to a further aspect of the invention, the method includes identifying a direction in which a relationship between a pair of CIs should be traversed.

According to a further aspect of the invention, the method includes defining an audit template that includes criteria for selecting CIs for an audit, the criteria including CI attributes, relationships between CIs, the direction of any the relationships, and a starting point in the CMDB from which to begin the audit.

According to a further aspect of the invention, the CMDB is represented as a directed graph where the CIs are nodes and relationships are edges, and further comprising transforming the graph into a relationship tree rooted at the starting point specified in the audit template, where all CIs that do not meet the audit template criteria are removed and cycles are removed based on the direction in which the relationships are to be traversed.

According to a further aspect of the invention, the method includes performing the audit by traversing the relationship tree of the specified CI nodes starting at the starting point CI, where any CI that are related to a specified CI down the relationship tree are iteratively compared until there is no further downward related CIs.

According to a further aspect of the invention, comparison results include a list of actual CIs that lack corresponding authorized CIs, a list of authorized CIs that lack corresponding actual CIs, variances between attributes and relationships of actual and authorized CIs, a list of variances between authorized CIs and established standards, and validating a lifecycle state for each CI.

According to a further aspect of the invention, comparing the actual CI instances to the authorized CI instances includes comparing attribute values defined for the authorized CIs with attribute values for the same attribute in the corresponding actual CIs, comparing relationships of the authorized CIs with other authorized CIs to the relationships of corresponding actual CIs with other actual CIs, validating the specific target of a relationship, comparing a relationship name between a source CI and a target CI, comparing a cardinality of the source CI and the target CI, and validating the direction of the relationship between a source CI and a target CI.

According to a further aspect of the invention, the method includes creating a match record to document each successful comparison, and a failure record to document each unsuccessful comparison.

According to a further aspect of the invention, the method includes storing the match and failure records.

According to a further aspect of the invention, the remedial action includes correcting a number of actual child instances when the cardinality of child instances differs between and actual CI and an authorized CI, correcting a relationship direction when a the relationship between a source CI and a target CI has a wrong direction.

According to a further aspect of the invention, the method includes defining a plurality of audit templates, where a given CI may be specified in more than one audit template, and checking whether an authorized CI has already been audited while traversing the relationship tree.

According to another aspect of the invention, there is provided a method for auditing and verifying configuration items (CIs) in an information technology (IT) configuration management database (CMDB), including defining an audit template that includes criteria for selecting CIs for an audit, the criteria including CI attributes, relationships between CIs, the direction of any the relationships, and a starting CI in the CMDB from which to begin the audit, representing the CMDB as a relationship tree whose nodes are CIs and edges are relationships and is rooted at the starting CI specified in the audit template, where all CIs that do not meet the audit template criteria are removed and cycles are removed based on the direction in which the relationships are to be traversed, and traversing the relationship tree of the specified CI nodes starting at the starting point CI comparing actual CI instances to authorized CI instances, where any CI that are related to a specified CI down the relationship tree are iteratively compared until there is no further downward related CIs.

According to a further aspect of the invention, comparing the actual CI instances to the authorized CI instances includes comparing attribute values defined for the authorized CIs with attribute values for the same attribute in the corresponding actual CIs, comparing relationships of the authorized CIs with other authorized CIs to the relationships of corresponding actual CIs with other actual CIs, validating the specific target of a relationship, comparing a relationship name between a source CI and a target CI, comparing a cardinality of the source CI and the target CI, and validating the direction of the relationship between a source CI and a target CI.

According to a further aspect of the invention, the method includes outputting comparison results, including a list of actual CIs that lack corresponding authorized CIs, a list of authorized CIs that lack corresponding actual CIs, variances between attributes and relationships of actual and authorized CIs, a list of variances between authorized CIs and established standards, and validating a lifecycle state for each CI.

According to a further aspect of the invention, the method includes defining link rules to link each authorized CI type stored in the CMDB to an actual CI type that is part of the IT infrastructure.

According to a further aspect of the invention, the method includes retrieving all authorized CI instances of the identified CI types from the CMDB.

According to a further aspect of the invention, the method includes retrieving all actual CI instances of the identified CI types from a discovery upload of the IT infrastructure.

According to another aspect of the invention, there is provided a program storage device readable by a computer, tangibly embodying a program of instructions executable by the computer to perform the method steps for auditing and verifying configuration items (CIs) in an information technology (IT) configuration management database (CMDB).

DETAILED DESCRIPTION OF EXEMPLARY EMBODIMENTS

Figure 1:
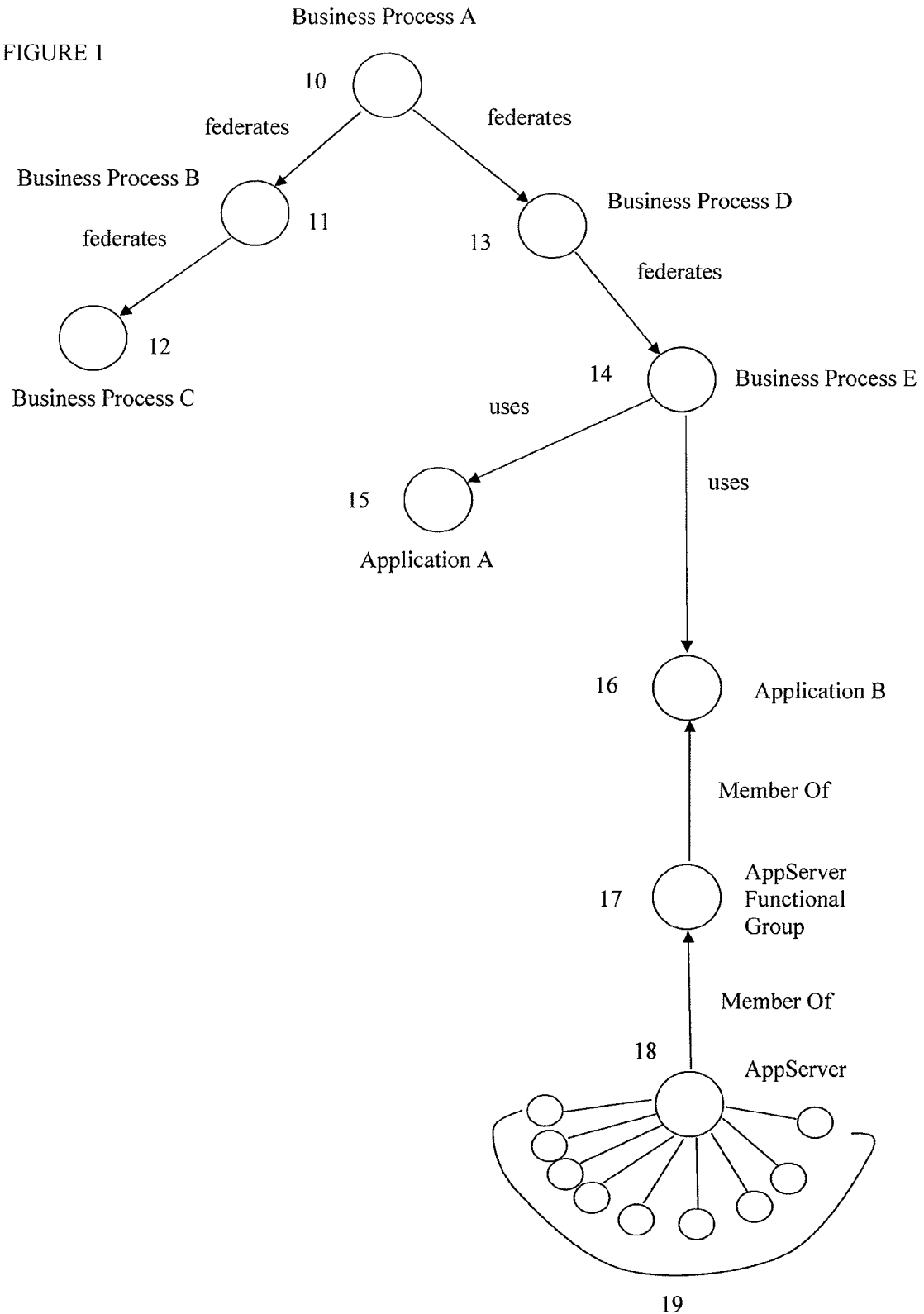
FIG. 1 depicts a representation of a subset of CIs selected from a CMDB as a tree-like data model, according to an embodiment of the invention.

Exemplary embodiments of the invention as described herein generally include systems and methods for IT service management process automation in the area of configuration control, audit verification, process analytics and automated variance detection. Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention.

The introduction of configuration control to the CMDB implies that it is desirable to have a process to ensure that necessary controlling documentation is made before the updates are made to the CMDB. Thus, the data reflected within a CMDB Record for a CI may differ from the actual data for a CI as identified from tools such as discovery adaptors. The CMDB is used as a repository for both authorized data and actual data. The authorized representation describes CI attributes (a subset of attributes for that type) updated by control CIs called from a change management process. These attributes have been approved in accordance with a change control process as reflected in change implementation commands issued from the change management process. The actual CI representation describes CI attributes (or a subset of attributes for that type) according to the latest discovery adaptor uploads. These may record the same values or may be at variance with the authorized representation. If the CMDB is maintaining an authorized and an actual representation of the configuration items, then there are security considerations to be addressed. A decision has to be made regarding access policies for these two representations and the relationship between them.

Each component CI of the IT environment is defined in terms of a number of attributes, some of which depend on the type of CI. For example, a computer system and a software package would both have attributes ObjectType and UID. However, a computer system might have attributes CPUspeed and Model, while a software package might have attributes Version and Port. In addition to CI attributes, CIs have relationships with other CIs. For example, a J2EE Component might have a Runs_On relationship to a J2EE server.

According to an embodiment of the invention, configuration control is provided by a configuration management process and a change management process working in concert with each other. The configuration management process maintains an accurate logical representation of the IT services and IT infrastructure in the configuration management database (CMDB). The CMDB records the attributes of each CI, and relationships with other CIs. The CMDB is maintained by the configuration management process and is used by all IT service management processes. The change management process manages changes to the IT environment to minimize the adverse effects of the change. To do so, the change management process relies on information in the CMDB to assess the potential impact of a change prior to approving it. Once a change is implemented, the change management process informs the configuration management process to update the CMDB to reflect the change.

The configuration management process ensures accuracy by imposing configuration control, that is, by requiring controlling documentation for changes to information in the CMDB. Thus the CMDB can then be regarded as repository of authorized information about CIs. The intent of configuration control is to prevent unauthorized changes to the IT environment and the CMDB. It is up to the discretion of the configuration management process to establish the policies regarding the extent and content of the controlling documentation required for a change. Generally, the policies will depend on the type of change requested and the lifecycle states of the CIs impacted by the change. For example, minimal or no controlling documentation may be required for a change to CI information for a CI in an initial state. This would facilitate the initial gathering of data for a new CI, such as a server. In contrast, a request to change the details of a server in production status would require more extensive controlling documentation and would imply adherence to a change management process protocol.

According to an embodiment of the invention, there is an authorized representation or space of CIs, which is under configuration control, and an actual (or discovered) representation or space of CIs which reflects discovered or gathered data aspects of the CI. The authorized representation, in the CMDB, describes described CI attributes that can be updated by a change management process in accordance with a change control process step. The actual representation describes CI attributes according to the latest discovery uploads. These may have the same values as or may be at variance with the authorized representation. The authorized CIs can be represented as manageable entities grouped with a subset of CIs pruned from a deeply connected tree or graph of CIs.

Control of the contents of the CMDB is useful as it reflects the actual IT environment. To ensure this, the contents of the CMDB should be regularly compared against the actual IT environment. Accomplishing this involves discovering, either manually, via automated scans, or importing from an authorized source, information on what is actually in the IT environment. This gathered data may come from a variety of sources. The actual data may then be compared with that which was authorized in accordance with the change management process. Before comparing against the authorized data in the CMDB, the gathered data is normalized and multiple sources reconciled. The comparison between the contents of the CMDB and the discovered or gathered data will detect variances between the two views which may be due to any or all of the following: (1) an unauthorized change to the IT environment; (2) an error in updating of the CMDB; or (3) a timing problem (i.e. the authorized change has been made in the environment but not as yet updated in the CMDB).

According to an embodiment of the invention, an audit template is defined that includes criteria for selecting unauthorized CIs to include in an audit. In general, an audit need not include every CI in a CMDB. The audit criteria are defined in terms of CI attributes and relationships and the direction of the relationships. Examples of relationships between a computer CI and an operating system CI include "installed-on" and "runs-on". The attributes of a CI include information such as name, version, vendor, build-id, etc. The audit templates are used to instantiate those aspects of the actual CIs that have been discovered in the authorized CI space. These criteria also include a starting point in the graph representation of the CMDB from which to begin the audit, and a direction to traverse the graph. From this starting point, the graph representation of the CMDB is pruned to eliminate cycles and those CIs that do not meet the template criteria, leaving a hierarchical tree as a data model for the CMDB. The audit process can traverse the tree to visit every CI node in the tree to perform the comparisons.

FIG. 1 depicts a representation of a subset of CIs selected from a CMDB for an audit verification and comparison. The selected CIs are represented as a tree whose root node 10 represents an enterprise application, Business Process A. Business Process A communicates with federated process Business Process B 11, which in turn communicates with federated process Business Process C 12. Business Process A also communicates with federated process Business Process D 13 which in turn communicates with federated process Business Process E 14. Business Process E 14 uses Application A 15 and Application B 16. AppServer Functional Group 17 is a member of Application B 16, and AppServer 18 is a member of AppServer Functional Group 17. AppServer 18 hosts a plurality of systems, applications, and devices 19. If an audit is to begin at Business Process D 13, the audit will compare all attributes in the authorized CI for Business Process D, all relationships in Business Process defined to other authorized CIs, all attributes and relationships defined in each of the related authorized CIs, and so on traversing down the tree to systems, applications, and devices 19. Note that "federated" or "federates", "uses", and "member of" are all further examples of relationships.

The responsibility for comparing the authorized CIs and relationships resides with the configuration management process, specifically a verify-and-audit function of the configuration management process. In addition to comparing the authorized and actual CIs, the verify-and-audit process also compares CIs against established standards. The results of these comparisons include:

A list of CIs found in the actual view but not in the authorized view;

Variances between CI attributes and relationships between CIs which exist in both the authorized and actual views;

A list of CIs in the authorized view which have not been discovered recently as defined by policy;

A list of variances between authorized CIs and established standards.

A full verify-and-audit process also checks that naming conventions are being followed, and verifies the contents of software and hardware libraries.

A configuration librarian or manager reviews the variances, determines the root cause, and takes an appropriate remedial action. Remediation actions include:

opening an incident to request a further investigation of the variance;

submitting a request for change (RFC) to correct the problem in the IT environment (e.g., removing an unauthorized server) or in the CMDB (e.g., adding a new server);

doing nothing, which is appropriate for a variance due to a timing issue (e.g., the CMDB update had not occurred when the comparison was made.

As part of configuration control, every CI managed by the CMDB has associated with it a lifecycle state. The lifecycle state is used for tracking purposes and should be kept current and made available for planning, decision making, and managing changes to the defined configurations. Example states for a configuration item are ordered, received, in acceptance test, live, under change, withdrawn, and disposed.

Figure 2:
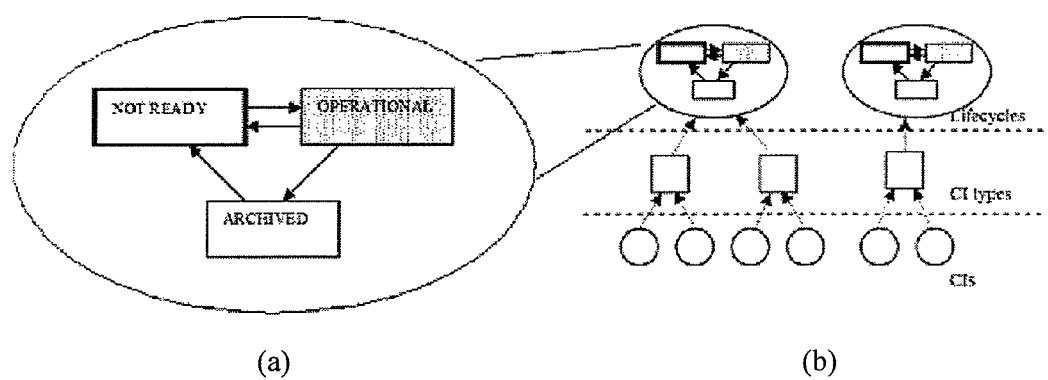
FIGS. 2(a)-(b) illustrates an example of a lifecycle of a CI, according to an embodiment of the invention.

FIG. 2(a) illustrates an example of a lifecycle containing three states: not ready, operational, and archived. In addition to states, a lifecycle also contains an indicator of the initial state, a set of permitted transitions between the states, and semantic validation information associated with three states. In FIG. 2(a), the initial state is "not ready", there are four valid transitions, and the "operational" state has additional semantic validation information. Different types of authorized CIs are associated with different lifecycles, and each lifecycle presents as set of possible states which may be assigned to the status attribute of CIs of that type, as shown in FIG. 2(b). For example, workstations may be associated with a lifecycle containing the states ordered, received, configured, installed, operational, and archived, while applications to be installed on the workstations could have states such as in-development, testing, operational, and decommissioned. This provides opportunities for semantic validation based on CI type, for example, the lifecycle of a server can be described distinctly from that of a business application. The lifecycle for each CI type may also be customized for each customer. Assignment is mediated by CI types, which are associated with CIs during remediation. CI types are assigned to lifecycles when the lifecycles are created, typically before remediation.

Transitions between lifecycle states are managed to ensure that, from a particular state, a CI is moved only to another legal state. In addition, again as part of configuration control, there is enforcement of attribute level semantic validation before a new CI is created and before modifying a CI. This validation check is attribute-specific, and for some attributes may also be CI-type or lifecycle-state specific as well. For example, a location attribute may be required for a CI representing a physical object such as a server before it may be put in an "installed" state, but possibly not before it is that state.

According to an embodiment of the invention, three lifecycle semantic validations are as follows.

1. Designating that for a particular CI type, there are requirements that designated fields be populated with information before a particular state be entered (or exited).

2. Designating selected states as protected, so that any changes to protected states demand that an RFC be associated with them. This validation capability recognizes that there are lifecycle states in which a greater degree of control is required than in other states, as described in detail below. The "protected" designation implies that changes to the CMDB for CIs in this state should be associated with a change record that serves as the controlling documentation. In addition, changes of state into protected states also require a change record. This includes the creation of a new CI if the initial state is protected. In FIGS. 2(a)-(b), the operational state is designated as a protected state.

3. Separating out state transition enablements from other attribute changes so as to provide greater control over the circumstances in which the lifecycle state can be modified. This validation capability provides a greater degree of assurance that the lifecycle state of a CI is changed in accordance with intent by presenting a different API/UI to change the lifecycle state of the CI.

Because a CI Record is a reflection of all changes that have taken place to a CI, it maintains a record of changes to the CI lifecycle state. If the CIs are tightly controlled, e.g. are in protected states as described above, than it is possible to perform a detailed audit between the authorized and actual states of the CIs and determine which CIs require remediation and whether there exist the necessary change authorizations to correct the variances. In the event that remediation is deemed appropriate, the remediation step is executed and an audit is reissued to check that the expected result has been realized.

For a given authorized CI instance, a verify-and-audit function according to an embodiment of the invention can perform the following steps.

1. Compare the attribute values defined in the authorized CI with the attribute values defined in the actual CI for the same attribute fields.

2. Compare the relationships the authorized CI has with other authorized CIs to the relationships the actual CI has with other actual CIs, validate the specific target for the relationship to determine whether it is the correct type, compare the relationship name between the source and the target, compare the cardinality of the source and target, the direction of the relationship, etc. The direction of the comparison of a given relationship between two CI Types can be determined through the top-down structure and implicit traversal of the tree-like data model. This simplification removes the need to identify any special logic for particular CI types at audit time.

Figure 3:
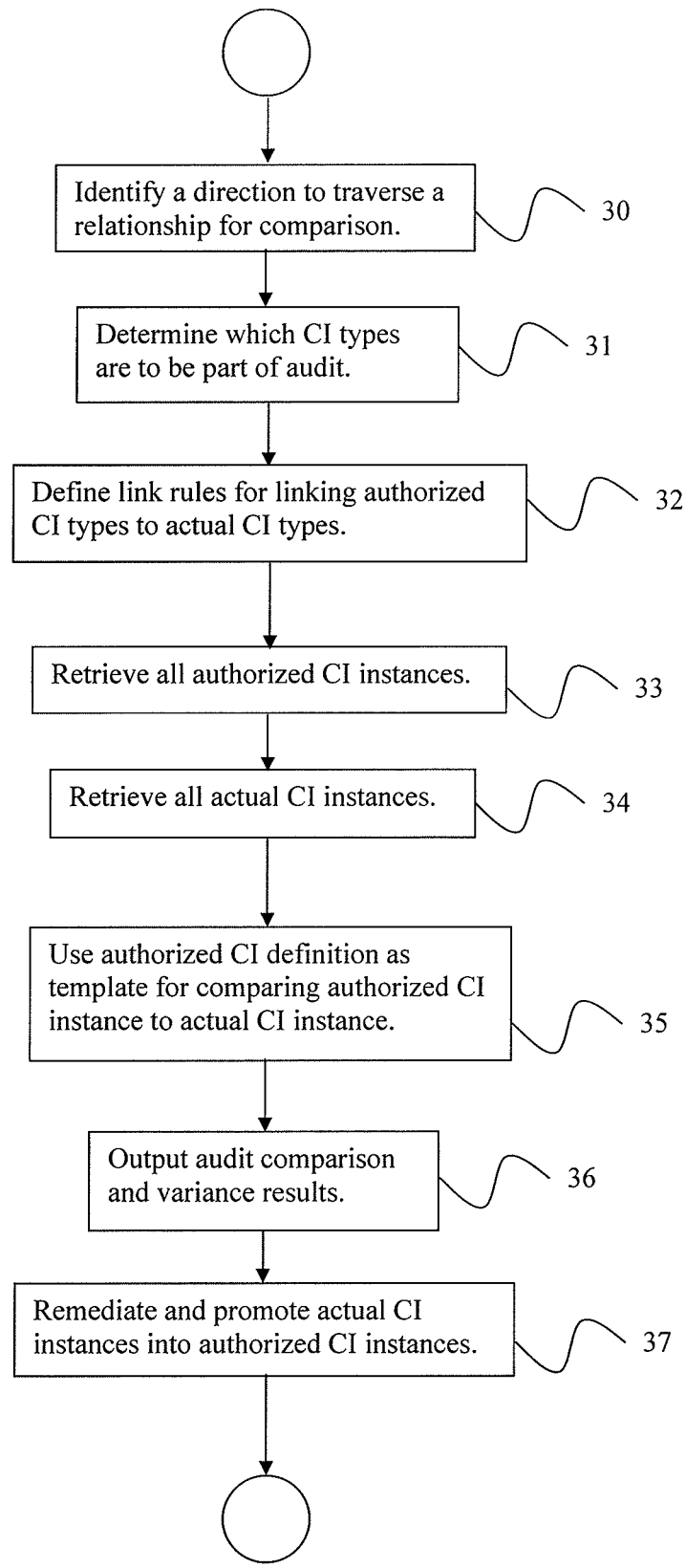
FIG. 3 is a flowchart of an algorithm for audit and verification automation according to an embodiment of the invention.

A flowchart of an algorithm for audit automation according to an embodiment of the invention is depicted in FIG. 3. Referring now to the flowchart, an algorithm according to an embodiment of the invention begins at step 30 by identifying a direction in which a relationship should be traversed for comparison. For example, for a "operation system runs-on computer system" relationship, for comparing a computer system authorized CI, the audit should compare down to the operating system. However, for comparing an operating system authorized CI, the audit should not compare up to the computer system. The next step 31 defines which configuration item types should be part of the audit. Relationships between configuration items can be extensive. To make the comparison process more feasible some scope for comparison should be established around a set of CI relationships to reconcile. For example, one could select those CIs impacted in an RFC. The scope of the comparison would be determined by an audit template which includes criteria for selecting unauthorized CIs to include in an audit. The audit criteria are defined in terms of CI attributes and relationships and the direction of the relationships. The scope in an audit automation according to an embodiment of the invention would be to limit the CI relationship comparison to CI relationships which transverse "down" the CI relationship tree as defined in the authorized CI definition template. Establishing this scope provides focus for reconciliation processing, minimizes the overall volume of comparison processing and provides comparison results to support the CI remediation process.

At step 32, the link rules for linking authorized CI types to actual CI types are defined. A link rule provides a mechanism to uniquely identify CI instances. A link rule is typically one of more sets of attributes and its criteria, as defined in the audit template.

At step 33, all authorized CI instances are retrieved for the identified audit CI types. At step 34, all actual CI instances are retrieved for the identified audit CI types. The authorized CI definition is used at step 35 as a template to compare the authorized CI instances with the actual CI instances. The authorized CI template defines what CIs and relationship types to compare and how deep the comparison should be.

The CI comparison will include the following actions. For a given authorized CI instance: (1) the attribute values defined in the authorized CI will be compared with those of the actual CI; (2) the relationships the authorized CI has with other authorized CIs will be compared with corresponding actual relationships of the actual CI. The validity of a specific target of the relationship will be checked for correctness, and the name of the relationship between a source and target will also be checked. A match record is created for each successful comparison, otherwise a failure record is created. The tree hierarchy will be traversed recursively until all targets are traversed and compared. In some cases a given object could be subject to a comparison more than once during an audit. This can be mitigated by checking if an authorized CI has already been processed, in which case it can be skipped.

At step 36, the audit comparison and variance results, that is, the match and failure records, are written out. If an authorized CI is in a "protected" state and requires an RFC, then an RFC is created to fulfill the variance.

At step 37, the actual CI instance data is remediated and promoted into authorized CI instance data per the authorized CI definition. A reconciliation approach according to an embodiment of the invention should take into account not only the containment hierarchy of the tree-like data model, but also named relationships such as the "uses"relationship, as otherwise the comparison mechanism will be partial and inaccurate. The reconciliation should compare model objects in any type of explicit relationship. When the cardinality of child instances differs between an actual CI and an authorized CI, remediation involves correcting the number of actual CI child instances to agree with that of the authorized CI. Furthermore, when the direction of a relationship differs between an actual CI and an authorized CI, remediation involves correcting the direction of the relationship.

The audit template provides a mechanism for capturing the semantics of the entities and relationships and their properties specified as policies. The audit template may or may not include all relationships and entities represented in the actual space and might represent only partial subset of the actual. The audit template can be either specified before runtime or defined and extended by a customer. There could a single or multiple audit templates for a given configuration item in authorized space, where a customer could choose a specific audit template to perform an audit.

For authorized CI to actual CI comparison, once the auditable CI data set is returned and the links are established between instances, comparison of the relationship and attributes for those CIs returned in the link and for all subsequent lower level CIs in the tree are also compared. Once the initial comparison of this CI relationship and all attributes is complete any CIs that are related to the selected CI down the relationship tree are also iteratively compared until there is no other downward related CI. For each comparison, a result is written to the reconciliation results.

It is to be understood that embodiments of the present invention can be implemented in various forms of hardware, software, firmware, special purpose processes, or a combination thereof. In one embodiment, the present invention can be implemented in software as an application program tangible embodied on a computer readable program storage device. The application program can be uploaded to, and executed by, a machine comprising any suitable architecture. Given the teachings provided herein, one of ordinary skill in the related art will be able to contemplate these and similar implementations or configurations of other embodiments of the present invention.

Figure 4:
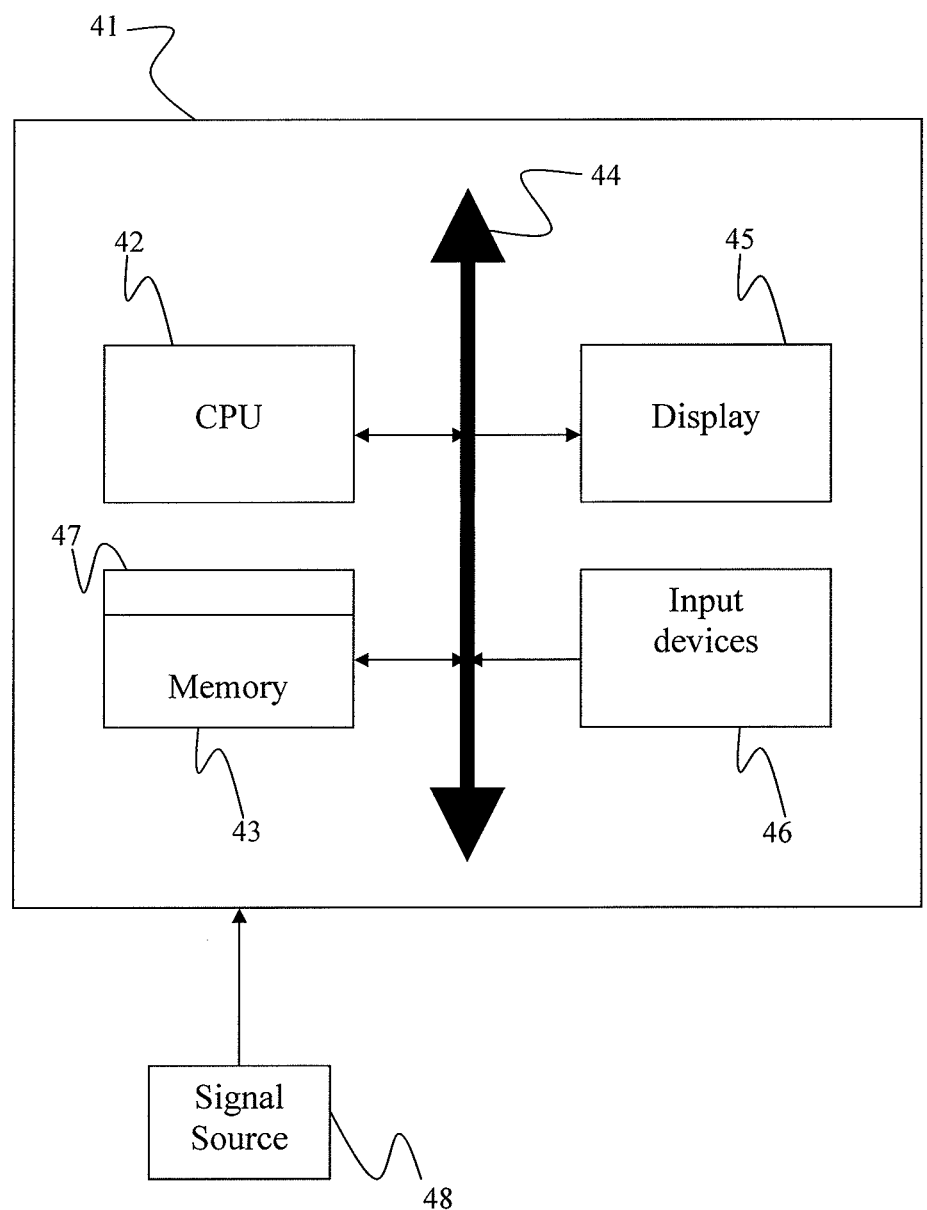
FIG. 4 is a block diagram of an exemplary computer system for implementing a method for audit and verification automation, according to an embodiment of the invention.

FIG. 4 is a block diagram of an exemplary computer system for implementing a method for audit and verification automation, according to an embodiment of the invention. Referring now to FIG. 4, a computer system 41 for implementing the present invention can comprise, inter alia, a central processing unit (CPU) 42, a memory 43 and an input/output (I/O) interface 44. The computer system 41 is generally coupled through the I/O interface 44 to a display 45 and various input devices 46 such as a mouse and a keyboard. The support circuits can include circuits such as cache, power supplies, clock circuits, and a communication bus. The memory 43 can include random access memory (RAM), read only memory (ROM), disk drive, tape drive, etc., or a combinations thereof. The present invention can be implemented as a routine 47 that is stored in memory 43 and executed by the CPU 42 to process the signal from the signal source 48. As such, the computer system 41 is a general purpose computer system that becomes a specific purpose computer system when executing the routine 47 of the present invention.

The computer system 41 also includes an operating system and micro instruction code. The various processes and functions described herein can either be part of the micro instruction code or part of the application program (or combination thereof) which is executed via the operating system. In addition, various other peripheral devices can be connected to the computer platform such as an additional data storage device and a printing device.

It is to be further understood that, because some of the constituent system components and method steps depicted in the accompanying figures can be implemented in software, the actual connections between the systems components (or the process steps) may differ depending upon the manner in which the present invention is programmed. Given the teachings of the present invention provided herein, one of ordinary skill in the related art will be able to contemplate these and similar implementations or configurations of the present invention.

While the present invention has been described in detail with reference to exemplary embodiments, those skilled in the art will appreciate that various modifications and substitutions can be made thereto without departing from the spirit and scope of the invention as set forth in the appended claims.

What is claimed is:

1. A method for auditing and verifying configuration items (CIs) in an information technology (IT) configuration management database (CMDB) comprising the steps of:

identifying which configuration item (CI) types should be part of an audit;

defining link rules to link an authorized CI type stored in a CMDB to an actual CI type that is part of an IT infrastructure;

retrieving all authorized CI instances of said identified CI types from said CMDB;

retrieving all actual CI instances of said identified CI types from a discovery upload of a current IT environment;
normalizing the actual CI instances;
comparing the normalized actual CI instances to corresponding authorized CI instances to detect variances between the normalized actual CI instances and the corresponding authorized CI instances; and
taking remedial action when variances are discovered.

2. The method of claim 1, further comprising identifying a direction in which a relationship between a pair of CIs should be traversed.

3. The method of claim 2, further comprising defining an audit template that includes criteria for selecting CIs for an audit, said criteria including CI attributes, relationships between CIs, the direction of any said relationships, and a starting point in said CMDB from which to begin said audit.

4. The method of claim 3, wherein said CMDB is represented as a directed graph wherein said CIs are nodes and relationships are edges, and further comprising transforming said graph into a relationship tree rooted at the starting point specified in said audit template, wherein all CIs that do not meet the audit template criteria are removed and cycles are removed based on the direction in which said relationships are to be traversed.

5. The methods of claim 4, further comprising performing said audit by traversing said relationship tree of said specified CI nodes starting at the starting point CI, wherein any CI that are related to a specified CI down the relationship tree are iteratively compared until there is no further downward related CIs.

6. The method of claim 1, wherein comparison results include a list of actual CIs that lack corresponding authorized CIs, a list of authorized CIs that lack corresponding actual CIs, variances between attributes and relationships of actual and authorized CIs, a list of variances between authorized CIs and established standards, and validating a lifecycle state for each CI.

7. The method of claim 1, wherein comparing the actual CI instances to the authorized CI instances includes comparing attribute values defined for the authorized CIs with attribute values for the same attribute in the corresponding actual CIs, comparing relationships of the authorized CIs with other authorized CIs to the relationships of corresponding actual CIs with other actual CIs, validating the specific target of a relationship, comparing a relationship name between a source CI and a target CI, comparing a cardinality of the source CI and the target CI, and validating the direction of the relationship between a source CI and a target CI.

8. The method of claim 7, further comprising creating a match record to document each successful comparison, and a failure record to document each unsuccessful comparison.

9. The method of claim 8, further comprising storing said match and failure records.

10. The method of claim 7, wherein said remedial action includes correcting a number of actual child instances when the cardinality of child instances differs between and actual CI and an authorized CI, correcting a relationship direction when a the relationship between a source CI and a target CI has a wrong direction.

11. The method of claim 5, further comprising defining a plurality of audit templates, wherein a given CI may be specified in more than one audit template, and checking whether an authorized CI has already been audited while traversing said relationship tree.

12. A method for auditing and verifying configuration items (CIs) in an information technology (IT) configuration management database (CMDB) comprising the steps of:

defining an audit template that includes criteria for selecting CIs for an audit, said criteria including CI attributes, relationships between CIs, the direction of any said relationships, and a starting CI in said CMDB from which to begin said audit;
representing said CMDB as a relationship tree whose nodes are CIs and edges are relationships and is rooted at the starting CI specified in said audit template, wherein all CIs that do not meet the audit template criteria are removed and cycles are removed based on the direction in which said relationships are to be traversed; and
traversing said relationship tree of said specified CI nodes starting at the starting point CI comparing normalized actual CI instances to corresponding authorized CI instances to detect variances between the normalized actual CI instances and the corresponding authorized CI instances, wherein any CI that are related to a specified CI down the relationship tree are iteratively compared until there is no further downward related CIs.

13. The method of claim 12, wherein comparing the actual CI instances to the authorized CI instances includes comparing attribute values defined for the authorized CIs with attribute values for the same attribute in the corresponding actual CIs, comparing relationships of the authorized CIs with other authorized CIs to the relationships of corresponding actual CIs with other actual CIs, validating the specific target of a relationship, comparing a relationship name between a source CI and a target CI, comparing a cardinality of the source CI and the target CI, and validating the direction of the relationship between a source CI and a target CI.

14. The method of claim 13, further comprising outputting comparison results, including a list of actual CIs that lack corresponding authorized CIs, a list of authorized CIs that lack corresponding actual CIs, variances between attributes and relationships of actual and authorized CIs, a list of variances between authorized CIs and established standards, and validating a lifecycle state for each CI.

15. The method of claim 12, further comprising defining link rules to link each authorized CI type stored in said CMDB to an actual CI type that is part of said IT infrastructure.

16. The method of claim 12, further comprising retrieving all authorized CI instances of said identified CI types from said CMDB.

17. The method of claim 12, further comprising retrieving all actual CI instances of said identified CI types from a discovery upload of the IT infrastructure.

18. A program storage device readable by a computer, tangibly embodying a program of instructions executed by the computer to perform the method steps for auditing and verifying configuration items (CIs) in an information technology (IT) configuration management database (CMDB), the method comprising the steps of:

identifying which configuration item (CI) types should be part of an audit;
defining link rules to link an authorized CI type stored in a CMDB to an actual CI type that is part of an IT infrastructure;
retrieving all authorized CI instances of said identified CI types from said CMDB;
retrieving all actual CI instances of said identified CI types from a discovery upload of a current IT environment;
normalizing the actual CI instances;
comparing the normalized actual CI instances to corresponding authorized CI instances to detect variances between the normalized actual CI instances and the corresponding authorized CI instances; and taking remedial action when variances are discovered.

19. The computer readable program storage device of claim 18, the method further comprising identifying a direction in which a relationship between a pair of CIs should be traversed.

20. The computer readable program storage device of claim 19, the method further comprising defining an audit template that includes criteria for selecting CIs for an audit, said criteria including CI attributes, relationships between CIs, the direction of any said relationships, and a starting point in said CMDB from which to begin said audit.

21. The computer readable program storage device of claim 20, wherein said CMDB is represented as a directed graph wherein said CIs are nodes and relationships are edges, and the method further comprises transforming said graph into a relationship tree rooted at the starting point specified in said audit template, wherein all CIs that do not meet the audit template criteria are removed and cycles are removed based on the direction in which said relationships are to be traversed.

22. The computer readable program storage device of claim 21, the method further comprising performing said audit by traversing said relationship tree of said specified CI nodes starting at the starting point CI, wherein any CI that are related to a specified CI down the relationship tree are iteratively compared until there is no further downward related CIs.

23. The computer readable program storage device of claim 18, wherein comparison results include a list of actual CIs that lack corresponding authorized CIs, a list of authorized CIs that lack corresponding actual CIs, variances between attributes and relationships of actual and authorized CIs, a list of variances between authorized CIs and established standards, and validating a lifecycle state for each CI.

24. The computer readable program storage device of claim 18, wherein comparing the actual CI instances to the authorized CI instances includes comparing attribute values defined for the authorized CIs with attribute values for the same attribute in the corresponding actual CIs, comparing relationships of the authorized CIs with other authorized CIs to the relationships of corresponding actual CIs with other actual CIs, validating the specific target of a relationship, comparing a relationship name between a source CI and a target CI, comparing a cardinality of the source CI and the target CI, and validating the direction of the relationship between a source CI and a target CI.

25. The computer readable program storage device of claim 24, the method further comprising creating a match record to document each successful comparison, and a failure record to document each unsuccessful comparison.

26. The computer readable program storage device of claim 25, the method further comprising storing said match and failure records.

27. The computer readable program storage device of claim 24, wherein said remedial action includes correcting a number of actual child instances when the cardinality of child instances differs between and actual CI and an authorized CI, correcting a relationship direction when a the relationship between a source CI and a target CI has a wrong direction.

28. The computer readable program storage device of claim 22, further comprising defining a plurality of audit templates, wherein a given CI may be specified in more than one audit template, and checking whether an authorized CI has already been audited while traversing said relationship tree.

29. A program storage device readable by a computer, tangibly embodying a program of instructions executed by the computer to perform the method steps for auditing and verifying configuration items (CIs) in an information technology (IT) configuration management database (CMDB), the method comprising the steps of:

defining an audit template that includes criteria for selecting CIs for an audit, said criteria including CI attributes, relationships between CIs, the direction of any said relationships, and a starting CI in said CMDB from which to begin said audit;

representing said CMDB as a relationship tree whose nodes are CIs and edges are relationships and is rooted at the starting CI specified in said audit template, wherein all CIs that do not meet the audit template criteria are removed and cycles are removed based on the direction in which said relationships are to be traversed; and traversing said relationship tree of said specified CI nodes starting at the starting point CI comparing normalized actual CI instances to corresponding authorized CI instances to detect variances between the normalized actual CI instances and the corresponding authorized CI instances, wherein any CI that are related to a specified CI down the relationship tree are iteratively compared until there is no further downward related CIs.

30. The computer readable program storage device of claim 29, wherein comparing the actual CI instances to the authorized CI instances includes comparing attribute values defined for the authorized CIs with attribute values for the same attribute in the corresponding actual CIs, comparing relationships of the authorized CIs with other authorized CIs to the relationships of corresponding actual CIs with other actual CIs, validating the specific target of a relationship, comparing a relationship name between a source CI and a target CI, comparing a cardinality of the source CI and the target CI, and validating the direction of the relationship between a source CI and a target CI.

31. The computer readable program storage device of claim 30, the method further comprising outputting comparison results, including a list of actual CIs that lack corresponding authorized CIs, a list of authorized CIs that lack corresponding actual CIs, variances between attributes and relationships of actual and authorized CIs, a list of variances between authorized CIs and established standards, and validating a lifecycle state for each CI.

32. The computer readable program storage device of claim 29, the method further comprising defining link rules to link each authorized CI type stored in said CMDB to an actual CI type that is part of said IT infrastructure.

33. The computer readable program storage device of claim 29, the method further comprising retrieving all authorized CI instances of said identified CI types from said CMDB.

34. The computer readable program storage device of claim 29, the method further comprising retrieving all actual CI instances of said identified CI types from a discovery upload of the IT infrastructure.

* * * * *